(12) United States Patent
Matosevich et al.

(10) Patent No.: US 11,301,162 B2
(45) Date of Patent: Apr. 12, 2022

(54) BALANCING RESILIENCY AND PERFORMANCE BY SELECTIVE USE OF DEGRADED WRITES AND SPARE CAPACITY IN STORAGE SYSTEMS

(71) Applicant: EMC IP Holding Company LLC, Hopkinton, MA (US)

(72) Inventors: Rivka Matosevich, Zichron Ya'acov (IL); Yosef Shatsky, Karnei Shomron (IL); Doron Tal, Haifa (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 39 days.

(21) Appl. No.: 16/888,742

(22) Filed: May 31, 2020

(65) Prior Publication Data
US 2021/0373796 A1 Dec. 2, 2021

(51) Int. Cl.
| | |
|---|---|
| G06F 3/06 | (2006.01) |
| G06F 11/20 | (2006.01) |
| G06F 11/10 | (2006.01) |

(52) U.S. Cl.
CPC ............ *G06F 3/0655* (2013.01); *G06F 3/061* (2013.01); *G06F 3/0689* (2013.01)

(58) Field of Classification Search
None
See application file for complete search history.

(56) References Cited

U.S. PATENT DOCUMENTS

| | | |
|---|---|---|
| 5,381,539 A | 1/1995 | Yanai et al. |
| 5,551,003 A | 8/1996 | Mattson et al. |
| 5,764,880 A | 6/1998 | Gerdt et al. |
| 6,052,799 A | 4/2000 | Li et al. |

(Continued)

FOREIGN PATENT DOCUMENTS

| | | |
|---|---|---|
| WO | 2015108670 A1 | 7/2015 |
| WO | PCT/US2019/024885 | 1/2020 |

(Continued)

OTHER PUBLICATIONS

Dell EMC, "Dell EMC VxRack FLEX," Dell EMC Product Overview, 2018, 5 pages.

(Continued)

*Primary Examiner* — Michael Alsip
(74) *Attorney, Agent, or Firm* — Ryan, Mason & Lewis, LLP

(57) ABSTRACT

Techniques are provided for processing user input/output (I/O) write requests in a fault-tolerant data storage system (e.g., a RAID storage system) by selecting between performing a degraded write operation or a write operation to spare capacity, when the fault-tolerant data storage system is operating in a degraded mode. A method includes receiving a user I/O write request comprising data to be written to a RAID array operating in a degraded mode, and determining whether spare capacity has been allocated for rebuilding missing data of an inaccessible storage device of the RAID array and whether a missing data block, which is associated with I/O write request, has been rebuilt to the spare capacity. A degraded write operation is performed without using the spare capacity, when the missing data block, which is associated with the data of the I/O write request, has not been rebuilt to the allocated spare capacity.

20 Claims, 7 Drawing Sheets

(56) References Cited

U.S. PATENT DOCUMENTS

| | | | |
|---|---|---|---|
| 6,941,420 | B2 | 9/2005 | Butterworth et al. |
| 7,213,165 | B2* | 5/2007 | Umberger ............ G06F 11/1092 714/42 |
| 7,305,579 | B2* | 12/2007 | Williams ............ G06F 11/1092 714/6.32 |
| 8,843,676 | B2 | 9/2014 | Rajamanickam et al. |
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2013/0205166 | A1* | 8/2013 | Nair ............ G06F 3/0611 714/6.23 |
| 2014/0215147 | A1* | 7/2014 | Pan ............ G06F 11/1092 711/114 |
| 2014/0215262 | A1 | 7/2014 | Li et al. |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0163587 | A1 | 5/2019 | Anna et al. |
| 2019/0227845 | A1 | 7/2019 | Sridhar et al. |
| 2020/0133503 | A1 | 4/2020 | Sun et al. |

FOREIGN PATENT DOCUMENTS

| | | |
|---|---|---|
| WO | PCT/US2019/024900 | 1/2020 |
| WO | PCT/US2021/029397 | 7/2021 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 12 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006.1598129, pp. 200-211.

Wikipedia, "Raft (Computer Science)," https://en.wikipedia.org/wiki/Raft_(computer_science), Feb. 10, 2020, 4 pages.

Wikipedia, "Paxos (ComputerScience)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

U.S. Appl. No. 16/343,942 filed in the name of Yonatan Shtarkman et al. Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. Apr. 22, 2019, and entitled "Snapshot-Enabled Storage System Implementing Algorithm for Efficient Reading of Data from Stored Snapshots."

U.S. Appl. No. 16/807,709, filed in the name of Avi Ruder et al. Mar. 3, 2020, and entitled "Management of Shared Resources in a Software-Defined Storage Environment."

U.S. Appl. No. 16/822,818, filed in the name of Itay Keller et al. Mar. 18, 2020, and entitled "Storage System Implementing Snapshot Longevity Ranking for Efficient Management of Snapshots."

U.S. Appl. No. 16/822,848, filed in the name of Itay Keller et al., Mar. 18, 2020, and entitled "Assignment of Longevity Ranking Values of Storage Volume Snapshots Based on Snapshot Policies."

U.S. Appl. No. 16/823,813, filed in the name of Itay Keller et al. Mar. 19, 2020, and entitled "Managing Incompressible Data in a Compression-Enabled Log-Structured Array Storage System."

U.S. Appl. No. 16/830,469, filed in the name of Roi Tagar et al. Mar. 26, 2020, and entitled "Storage Block Balancing Using Volume Part Migration."

U.S. Appl. No. 16/830,473, filed in the name of Yugal Peleg Lieblich et al. Mar. 26, 2020, and entitled "Replicated State Cluster with Standby Node State Assessment During Leadership Transition."

U.S. Appl. No. 16/830,946, filed in the name of Gil BenZeev et al. Mar. 26, 2020, and entitled "Storage Volume Migration Scheduling Based on Storage Volume Priorities and Specified Constraints."

U.S. Appl. No. 16/832,763, filed in the name of Michal Yarimi et al. Mar. 27, 2020, and entitled "Managing Storage Device Errors During Processing of Inflight Input/Output Requests."

U.S. Appl. No. 16/834,363, filed in the name of Itay Keller et al. Mar. 30, 2020, and entitled "Managing Least Recently Used Cache Using Reduced Memory Footprint Sequence Container."

U.S. Appl. No. 16/836,824, filed in the name of Itay Keller et al. Mar. 31, 2020, and entitled "Management of Volume Snapshots in a Data Storage System."

* cited by examiner

BALANCING RESILIENCY AND PERFORMANCE BY SELECTIVE USE OF DEGRADED WRITES AND SPARE CAPACITY IN STORAGE SYSTEMS

TECHNICAL FIELD

This disclosure relates generally to data storage management in information processing systems and, more particularly, to data storage management techniques to enhance performance and reliability of data storage.

BACKGROUND

Various techniques are utilized in data storage systems to provide resiliency and error correction to protect stored data in the event of failures of storage devices or storage nodes. For example, such techniques include erasure coding techniques and RAID (Redundant Array of Independent Drives) techniques. In general, RAID is a technology that is utilized to enhance the performance and reliability of data storage. There are various RAID levels which implement different combinations of techniques such as data mirroring, data striping, parity, etc., to provide fault tolerance and allow missing data to be recovered or otherwise reconstructed in the event of a failure of a storage device such as a hard disk drive (HDD), a solid-state drive (SSD), etc.

For various applications and services, data storage systems are typically required to have "5 nines" availability (99.999% uptime) or "6 nines" availability (99.9999% uptime). A key factor in providing such high level of availability for a RAID storage system is the ability of a RAID control system to correct errors at a much faster pace than the pace at which errors are likely to occur, otherwise, too many device errors will lead to data loss and offline time. It is common to reserve some amount of spare capacity that can be immediately utilized by the RAID control system when a storage device fails. This shortens the amount of time the RAID storage system is vulnerable to additional failures. Even when no spare capacity is available, the RAID storage system can operate in a "degraded mode" as long as the number of currently existing failures does not exceed the maximum number of failures, or fault tolerance level, that the RAID system is configured to support. When there is one or more device failures in a RAID storage system, not all data (e.g., data strips, parity data, etc.) can be written to the RAID array, since only the existing data strips or parity data on non-faulty storage devices can be written, which results in what is referred to as a "degraded writes." When a RAID storage system is operating in a degraded mode, there are performance implications associated with utilizing degraded writes to handle user input/output (I/O) write requests.

SUMMARY

Exemplary embodiments of the disclosure include techniques for processing user I/O write requests in a fault-tolerant data storage system (e.g., a RAID storage system) by selecting between performing a degraded write operation or performing a write operation to spare capacity, when the fault-tolerant data storage system is operating in a degraded mode. For example, one embodiment includes a method that is implemented by a storage control system. The storage control system receives a user I/O write request comprising data to be written to a RAID array comprising a plurality of storage devices, which is managed by the storage control system. The storage control system determines whether the RAID array is operating in a degraded mode in which at least one storage device of the plurality of storage devices of the RAID array is inaccessible as a result of a failure. In response to determining that the RAID array is operating in a degraded mode, the storage control system determines (i) whether spare capacity has been allocated to the RAID array for rebuilding missing data of the at least one inaccessible storage device of the RAID array and (ii) whether a missing data block, which is associated with the data of the I/O write request, has been rebuilt to the allocated spare capacity. The storage control system processes the user I/O write request by performing a degraded write operation using remaining storage devices of the plurality of storage devices of the RAID array without using the spare capacity, in response to determining that the spare capacity has been allocated to the RAID array but that the missing data block, which is associated with the data of the I/O write request, has not been rebuilt to the allocated spare capacity.

In another embodiment, in response to determining that the RAID array is operating in a degraded mode, the storage control system determines whether a remaining level of resiliency of the RAID array is sufficient to provide fault tolerance against at least one additional failure of the remaining storage devices of the RAID array. Then, in response to determining that the remaining level of resiliency of the RAID array is sufficient to provide fault tolerance against at least one additional failure of the remaining storage devices of the RAID array, the storage control system performs the degraded write operation using the remaining storage devices of the plurality of storage devices of the RAID array without using the allocated spare capacity. On the other hand, in response to determining that the remaining level of resiliency of the RAID array is not sufficient to provide fault tolerance against at least one additional failure of the remaining storage devices of the RAID array, the storage control system processes the user I/O write request by performing a write operation using the allocated spare capacity and the remaining storage devices of the RAID array.

Other embodiments of the disclosure include, without limitation, methods, systems, and articles of manufacture comprising processor-readable storage media, which are configured to process user I/O write requests in a fault-tolerant data storage system by selecting between performing a degraded write operation or performing a write operation to spare capacity, when the data storage system is operating in a degraded mode.

DETAILED DESCRIPTION

Exemplary embodiments of the disclosure will now be discussed in further detail with regard to systems and methods for implementing a fault-tolerant data storage system, such as a RAID storage system, which is configured to process user I/O write requests by selecting between performing a degraded write operation or performing a write operation to spare capacity, when the fault-tolerant data storage system is operating in a degraded mode. For purposes of illustration, exemplary embodiments will be described herein with reference to exemplary information processing systems that implement RAID data storage systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1A:
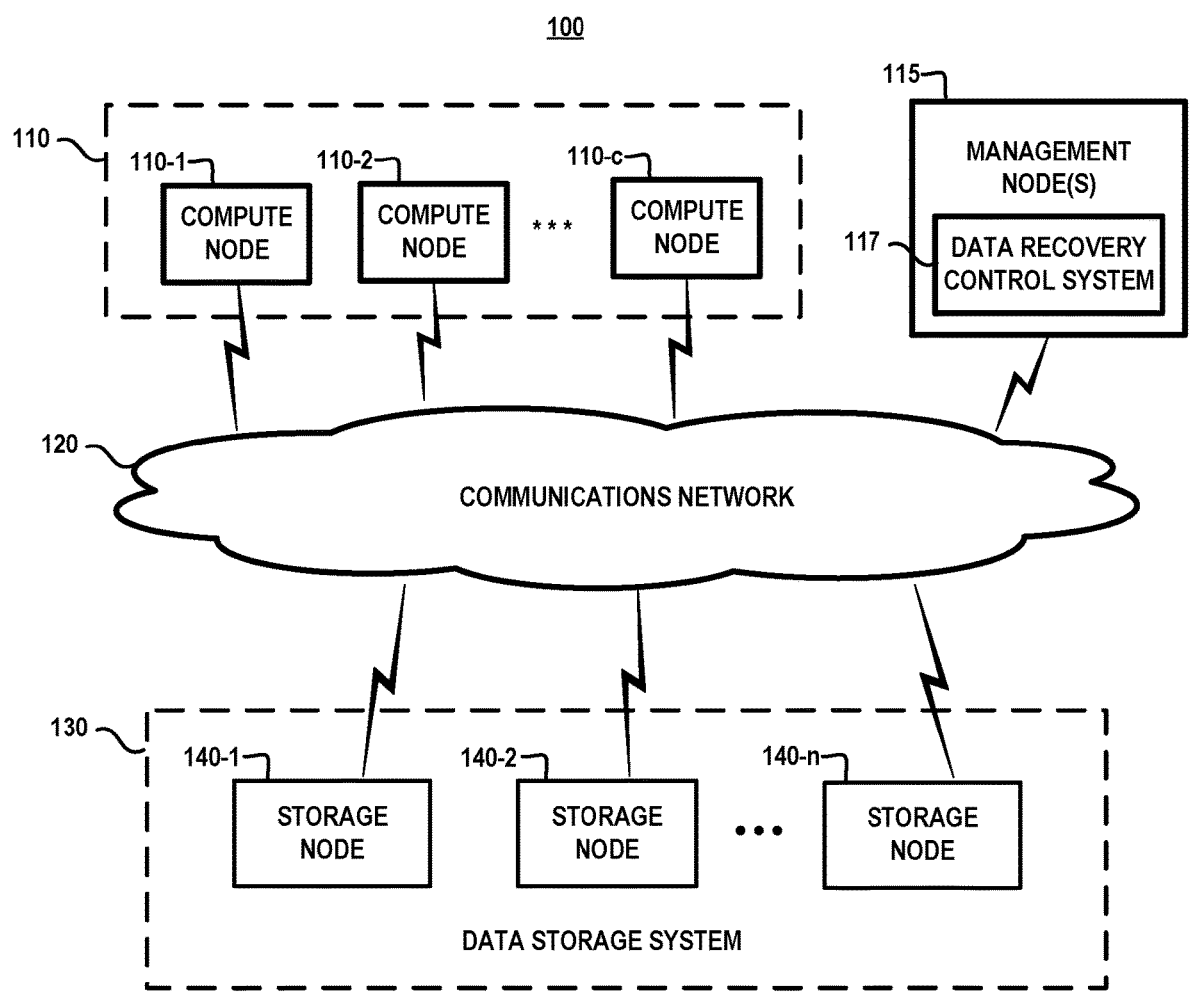
FIGS. 1A and 1B schematically illustrate an information processing system comprising a RAID storage system that is configured to process user I/O write requests by selecting between performing a degraded write operation or performing a write operation to spare capacity, when operating in a degraded mode, according to an exemplary embodiment of the disclosure.
Figure 1B:
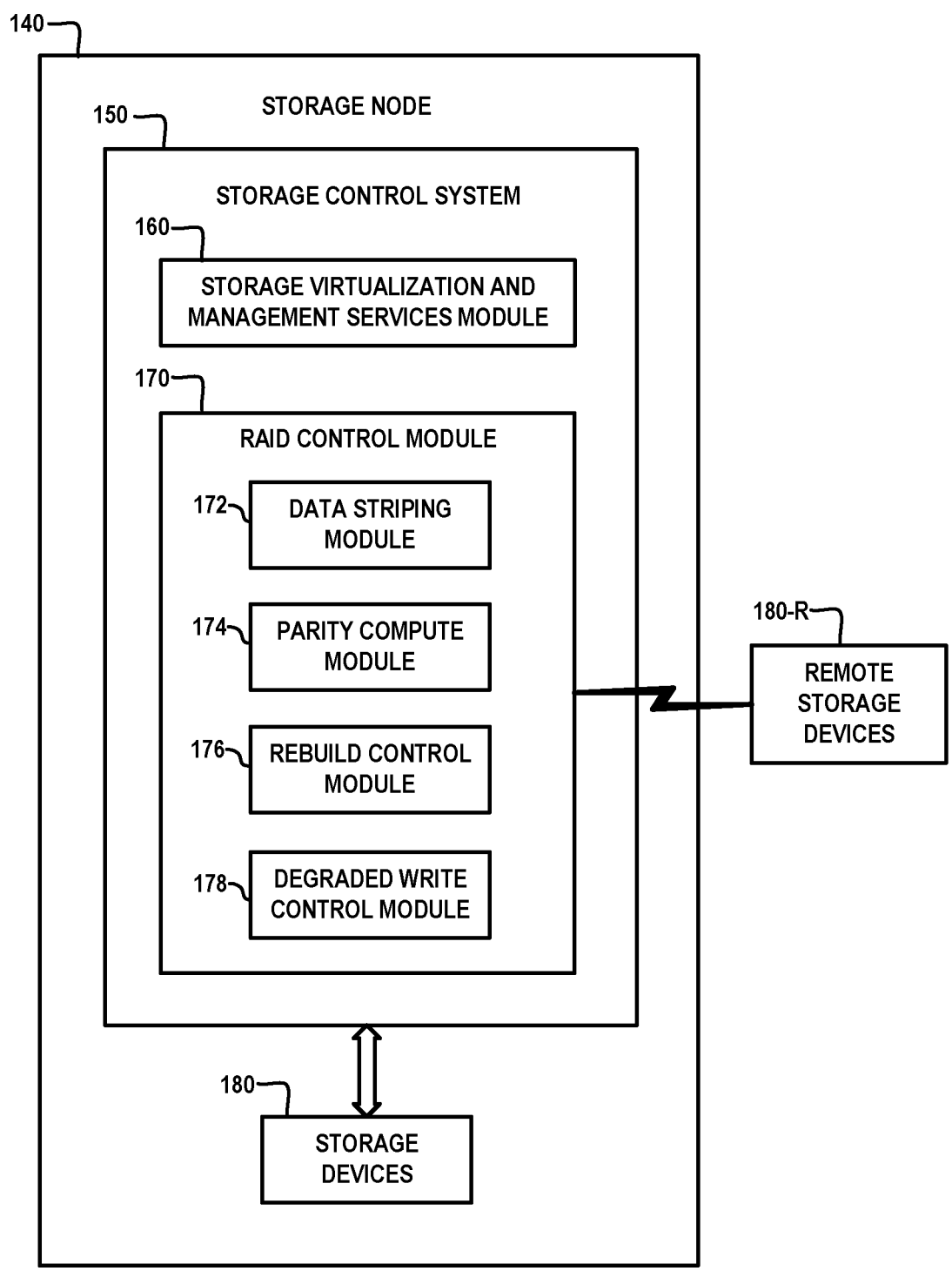

FIGS. 1A and 1B schematically illustrate an information processing system comprising a RAID storage system that is configured to process user I/O write requests by selecting between performing a degraded write operation or performing a write operation to spare capacity, when operating in a degraded mode, according to an exemplary embodiment of the disclosure. More specifically, FIG. 1A schematically illustrates an information processing system 100 which comprises a plurality of compute nodes 110-1, 110-2, . . . , 110-c (collectively referred to as compute nodes 110), one or more management nodes 115 (which support a management layer of the system 100), a communications network 120, and a data storage system 130 (which support a data storage layer of the system 100). The data storage system 130 comprises a plurality of storage nodes 140-1, 140-2, . . . , 140-n (collectively referred to as storage nodes 140, or each singularly referred to as storage node 140). In the context of exemplary embodiments as discussed in further detail below, the management nodes 115 implement a data recovery control system 117 which is configured to perform various functions to support data recovery operations in the event of failures of storage devices and/or storage nodes 140 of the data storage system 130. FIG. 1B schematically illustrates an exemplary framework of at least one or more of the storage nodes 140.

In particular, as shown in FIG. 1B, the storage node 140 comprises a storage control system 150 comprising a storage virtualization and management services module 160, a RAID control module 170, and local storage devices 180. The RAID control module 170 comprises various modules including, but not limited to, a data striping module 172, a parity compute module 174, a rebuild control module 176, and a degraded write control module 178, the functions of which will be explained in further detail below. In some embodiments, the storage control system 150 comprises a software layer of a software-defined storage system wherein the RAID control module 170 is an integrated software module of the storage control system 150, which implements a software RAID control system (e.g., RAID drivers). In other embodiments, the RAID control module 170 comprises a stand-alone software system that separate from the storage control system 150 but configured to operate in conjunction with the storage control system 150. It is to be further noted that the storage control system 150 may include additional modules and other components that are typically included in various implementations of storage control systems (e.g., software-defined storage systems), although such additional modules and other components are omitted for clarity and simplicity of illustration.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue I/O requests that are processed by a corresponding one of the storage nodes 140. The term I/O request as used herein refers to at least one of input and output. For example, an I/O request may comprise a write request and/or a read request directed to stored data of a given one of the storage nodes 140 of the data storage system 130.

The compute nodes 110 are configured to write data to and read data from the storage nodes 140 in accordance with applications executing on the compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly construed and not viewed as being limited to storage systems of any particular type or types. A storage system in some embodiments can be implemented using a combination of storage nodes and compute nodes. In some embodiments, the storage nodes 140 comprise storage server nodes (e.g., server node 500, shown in FIG. 5) having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed as a server node (e.g., physical server machine) which comprises local persistent storage devices (e.g., storage devices 180) and which comprises a storage control system (e.g., control system 150, FIG. 1B) that is configured to manage and control access to the local persistent storage devices. A storage node may further comprise one or more compute nodes to process data and execute tasks/workloads.

In some embodiments, as schematically illustrated in FIG. 1B, the storage node 140 is a physical server node or storage appliance, wherein the storage devices 180 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). These and various combinations of multiple different types of storage devices 180 may be implemented in the storage node 140. In this regard, the term "storage device" as used herein is intended to be broadly construed, so as to encompass, for example, SSDs, HDDs, flash drives, hybrid drives or other types of storage media. The data storage devices 180 are connected to the storage node 140 through any suitable host interface, e.g., a host bus adapter, using suitable protocols such as ATA, SATA, eSATA, NVMe, SCSI, SAS, etc. In other embodiments, the storage node 140 can be network connected to one or more NAS nodes over a local area network.

The storage control system 150 is configured to manage the storage devices 180 and control I/O access to the storage devices 180 and/or other storage resources (e.g., DAS or NAS resources) that are directly attached or network-connected to the storage node 140. In some embodiments, the storage control system 150 is a component (e.g., storage data server) of a software-defined storage (SDS) system which supports the virtualization of the storage devices 180 by separating the control and management software from the underlying hardware architecture of the storage devices 180. The storage control system 150 runs on a server operating system of the storage node 140 to provide storage services. More specifically, in a software-defined storage environment, the storage control system 150 comprises a storage data server that is configured to abstract storage access services from the underlying storage hardware, and thereby control and manage I/O requests issued by the compute nodes 110, as well as support networking and connectivity. In this instance, the storage control system 150 comprises a software layer that is hosted by the storage node 140 and deployed in the data path between the compute nodes 110 and the storage devices 180 of the storage node 140, wherein the storage control system 150 is configured to process I/O requests from the compute nodes 110 by accessing the storage devices 180 to store/retrieve data to/from the storage devices 180 based on the I/O requests.

In a software-defined storage environment, the storage control system 150 comprises a storage data server that is installed on each storage node that will contribute its storage to the data storage system. The storage control system 150 is configured to provision, orchestrate and manage the local storage resources (e.g., the storage devices 180) of the storage node 140. For example, the storage control system 150 implements methods that are configured to create and manage storage pools (e.g., virtual pools of block storage) by aggregating capacity from the storage devices 180. The storage control system 150 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In the software-defined storage environment, each of the storage nodes 140 in FIG. 1A can run an instance of the storage control system 150 to convert the respective local storage resources (e.g., DAS storage devices and/or NAS storage devices) of the storage nodes 140 into local block storage. Each instance of the storage control system 150 contributes some or all of its local block storage (HDDs, SSDs, PCIe, NVMe and flash cards) to an aggregated pool of storage of a storage server node cluster (e.g., cluster of storage nodes 140) to implement a server-based SAN (e.g., virtual SAN). In this configuration, each storage node 140 is part of a loosely coupled server cluster which enables "scale-out" of the software-defined storage environment, wherein each instance of the storage control system 150 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage control systems 150 operating as storage data servers to create and expose volumes of a storage layer, the software-defined storage environment comprises other components such as (i) data storage clients that consume the storage layer and (ii) metadata managers that coordinate the storage layer. More specifically, on the client-side (e.g., compute nodes 110), an SDS data storage client (SDC) is a lightweight block device driver that is deployed on each node (e.g., server node) that consumes the shared block storage volumes that are exposed by the storage control systems 150 of the storage nodes 140. In particular, the SDCs run on the same hosts (e.g., servers) as the compute nodes 110 which require access to the block devices that are exposed and managed by the storage control systems 150 of the storage nodes 140. The SDC exposes block devices representing the virtual storage volumes that are currently mapped to that host. In particular, the SDC serves as a block driver for a client (server), wherein the SDC intercepts I/O requests issued by a compute node 110, and utilizes the intercepted I/O request to access the block storage that is managed by the storage control systems 150. The SDC provides the operating system or hypervisor (which runs the SDC) access to the logical block devices (e.g., volumes).

In the software-defined storage environment, the primary data and copies of each storage volume are distributed over the storage nodes 140, and each SDC has knowledge of which SDS data storage server (e.g., storage control system 150) holds its block data, so multipathing can be accomplished natively through the SDCs. In particular, each SDC knows how to direct an I/O request to the relevant destination SDS storage data server (e.g., storage control system 150). In this regard, there is no central point of routing, and each SDC performs is own routing independent from any other SDC. This implementation prevents unnecessary network traffic and redundant SDS resource usage. Each SDC maintains peer-to-peer connections to every storage control system 150 that manages the storage pool so each SDC can communicate over multiple pathways to all of the storage nodes 140 which store the data. The multi-point peer-to-peer communication fashion allows the SDCs to read and write data to and from all points simultaneously, eliminating bottlenecks and quickly routing around failed paths.

The management nodes 115 in FIG. 1A implement a management layer that is configured to manage and configure the storage environment of the system 100. In some embodiments, the management nodes 115 comprise the SDS metadata manager components, wherein the management nodes 115 comprise a tightly-coupled cluster of nodes that are configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that are required for system operation of the SDS environment such as configuration changes, managing the SDS data clients and data servers, device mapping, values, snapshots, system capacity including device allocations and/or release of capacity, RAID protection, recovery from errors and failures, and system rebuild tasks including rebalancing.

While FIG. 1A shows an exemplary embodiment of a two-layer deployment in which the compute nodes 110 are separate from the storage nodes 140 and connected by the communications network 120, in other embodiments, a converged infrastructure (e.g., hyperconverged infrastructure) can be implemented to consolidate the compute nodes 110, storage nodes 140, and communications network 120 together in an engineered system. For example, in a hyperconverged deployment, a single-layer deployment is implemented in which the storage data clients and storage data servers (e.g., storage control systems 150) run on the same nodes (e.g., each node deploys a storage data client and storage data servers) such that each node is a data storage consumer and a data storage supplier. In other embodiments, the system of FIG. 1A can be implemented with a combination of a single-layer and two-layer deployment.

Regardless of the specific implementation of the storage environment, as noted above, the various modules of the storage control system 150 of FIG. 1B collectively provide data storage and management methods that are configured to perform various function as follows. In particular, the storage virtualization and management services module 160 implements any suitable logical volume management (LVM) system which is configured to create and manage local storage volumes by aggregating the local storage devices 180 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data. In some embodiments, the storage devices 180 are configured as block storage devices where raw volumes of storage are created and each block can be controlled as, e.g., an individual disk drive by the storage control system 150. Each block can be individually formatted with a same or different file system as required for the given data storage system application. The storage pools are primarily utilized to group storage devices based on device types and performance. For example, SSDs are grouped into SSD pools, and HDDs are grouped into HDD pools. Furthermore, in some embodiments, the storage virtualization and management services module 160 implements methods to support various data storage management services such as data protection, data migration, data deduplication, replication, thin provisioning, snapshots, data backups, etc.

The RAID control module 170 implements control methods that are configured to distribute, organize, and manage data across multiple storage devices of a RAID array according to a given RAID level configuration (e.g., RAID 1, RAID 6, etc.). The RAID control module 170 of the given storage node 140 is configured to manage the RAID array which comprise multiple storage devices HDDs or SSDs, etc., including local storage devices 180 of the given storage node 140 and remote storage devices 180-R of other storage nodes 140 in the data storage system 130 shown in FIG. 1A. In some embodiments, the RAID control module 170 of the given storage node 140 is configured to communicate directly with the remote storage devices 180-R on other storage nodes 140, which are part of the RAID array that is managed and controlled by the RAID control module 170. In this regard, the RAID control module 170 can perform I/O read operations and I/O write operations on the remote storage devices 180-R which are part of the RAID array managed by the RAID control module 170.

The RAID control module 170 is configured to control and manage the organization of data in a given RAID array using RAID storage techniques such as striping, mirroring, parity, and combinations thereof, depending on the given RAID level configuration. In particular, the data striping module 172 implements methods that are configured to support RAID schemes which implement data striping techniques to distribute data over a plurality of storage devices of a RAID array. In particular, the data striping module 172 implements methods that are configured to divide data into resiliency units called "stripes" and divide the stripes into evenly sized data "strips" that are stored on different storage devices within the RAID array.

The parity compute module 174 implements methods that are configured to support parity-based RAID schemes. In particular, the parity compute module 174 implements methods that are configured to compute parity data (for, e.g., data stripes) using one or more types of parity functions (e.g., eXclusive OR (XOR) function, etc.). The types of parity functions that are implemented will depend on the RAID level configurations that are supported by the RAID control module 170. The rebuild control module 176 implements methods that are configured to control the rebuilding of spare capacity in the event of one or more failures of a given RAID array (e.g., failure of a storage device in the given RAID array, failure of a given storage node 140 which includes a storage device that is implemented in the given RAID array, etc.).

The RAID control module 170 implements methods that are configured to provide a balance between I/O performance and data resiliency when processing user I/O write requests during periods when the RAID control module 170 is operating a given RAID array in a degraded mode due to one or more failures of storage devices and/or storage nodes associated with the given RAID array. More specifically, when the RAID array is operating in a degraded mode, the degraded write control module 178 is configured to make intelligent decisions for processing a user I/O write request by selecting between (i) performing a degraded write to the RAID array or (ii) performing write operations to spare capacity. As explained in further detail below, such a determination is made based on factors such as, e.g., the amount of resiliency that remains for the given RAID configuration when operating in a degraded mode, and whether spare capacity has been allocated and a current state of a rebuild process, and other relevant factors. When the RAID array is operating in a degraded mode, the RAID control module 170 distinguishes between user I/O write requests to the RAID array and I/O requests that are associated with a background rebuild process of the RAID array, which are handled by the rebuild control module 176.

In some embodiments, the RAID control module 170 comprises a software module of the storage control system 150, in which the RAID functionality is executed using the operating system and existing hardware of the host storage node 140. For example, a software-based RAID control 170 module utilizes existing hardware such as the processors (e.g., CPUs) and hardware controllers such as SAS, IDE, SATA, SCSI, SSD controllers. In instances where a host storage node 140 implements a hardware RAID controller, the storage control system 150 can override the hardware RAID controller such that the software-based RAID control module 170 controls the RAID configuration and functionalities. In some embodiments, software-based RAID control module 170 can utilize the read cache and write cache of the hardware RAID controller to support read and write operations to the RAID array.

As is known in the art, different RAID levels have different fault tolerance, data redundancy, and performance characteristics and properties. In particular, fault tolerance refers to the ability of the RAID array to survive one or more failures without loss of data. The performance of a given RAID level refers to the change in read and write performance (e.g., speed) of the given RAID array as compared to reading and writing to a single storage device. The capacity of a given RAID array refers to the amount of data that can be written to the RAID array. The capacity of a given RAID array is typically less than the total capacity of the storage devices within the given RAID array.

Figure 2:
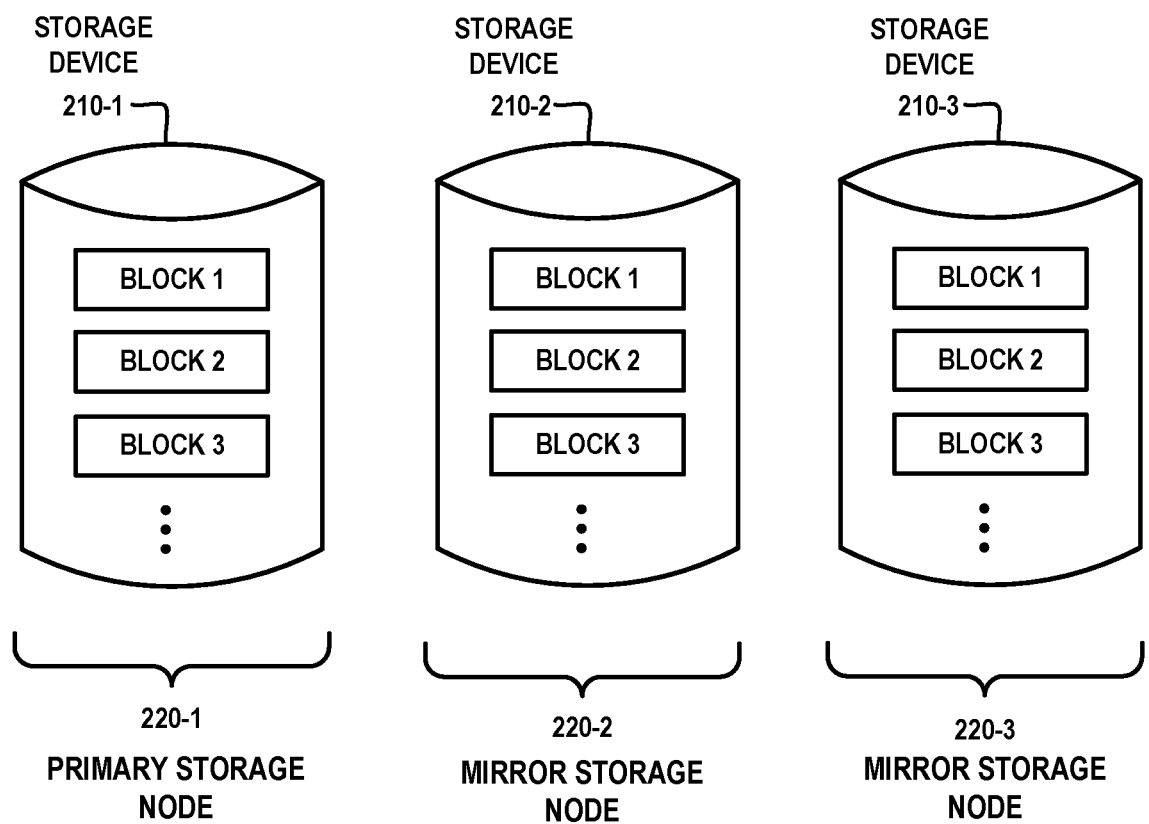
FIG. 2 schematically illustrates a RAID 1 configuration which can be implemented in the information processing system of FIGS. 1A and 1B, according to an exemplary embodiment of the disclosure.

Exemplary embodiments of the disclosure can be implemented using various types of RAID level configurations. For illustrative purposes, exemplary embodiments will be discussed in the context of RAID 1 and RAID 6 level implementations. For example, FIG. 2 schematically illustrates a RAID 1 configuration 200 which can be implemented in the system 100 of FIGS. 1A and 1B. In general, RAID 1 utilizes a data mirroring process to store data to a given storage device and store a mirror copy (alternatively referred to as replica) of the data to one or more additional storage devices. In particular, as shown in FIG. 2, the RAID 1 configuration 200 comprises three storage devices 210-1, 210-2, and 210-3, wherein each storage device 210-1, 210-2, and 210-3 stores a copy of each data Block 1, Block 2, Block 3, etc. In some embodiments, as shown in FIG. 2, each storage device 210-1, 210-2, and 210-3 is associated with a different storage node 220-1, 220-2, and 220-3, respectively.

The RAID 1 configuration 200 provides fault tolerance using the data mirroring techniques without parity. More specifically, in the exemplary embodiment of FIG. 2, the RAID 1 configuration 200 provides resiliency against (i) a single failure, e.g., a failure of one of the storage devices 210-1, 210-2, and 210-3 or one of the storage nodes 220-1, 220-2, and 220-3 and (ii) two failures, e.g., a failure of two of the storage devices 210-1, 210-2, and 210-3 or two of the storage nodes 220-1, 220-2, and 220-3. In the event of a single or double failure, the RAID control module 170 can access the copies of the data blocks Block 1, Block 2, Block 3, etc., which are stored in the functional storage device(s). The capacity of the RAID 1 configuration is equal to the capacity of a single storage device within the RAID 1 array.

In this regard, the RAID 1 configuration 200 shown in FIG. 2 implements mirroring techniques and three storage devices to provide fault tolerance against two failures. Indeed, since each storage device 210-1, 210-2, and 210-3 have identical copies of the data blocks, any I/O read request, or I/O write request can be serviced by any one of the storage device 210-1, 210-2, and 210-3 in the RAID array which is currently accessible and operational. In the event of storage device or storage node failures, the RAID 1 configuration 200 can operate in a degraded mode as long as one storage device within the RAID array is accessible and operational. In other embodiments of RAID such as RAID 5 and RAID 6, distributed parity and striping of data across multiple storage devices is utilized to provide fault tolerance against one or more failures, depending on the RAID configuration.

In particular, RAID 5 and RAID 6 utilize a combination of block level data striping and distributed parity techniques to provide resiliency and error correction in the event of a failure (e.g., storage device failure). The process of data striping for RAID 5 and RAID 6 comprises dividing stored data into resiliency units which are referred to as "stripes" and further dividing the data "stripes" into a plurality of equal-sized data blocks referred to as "strips." The constituent strips of a given stripe are stored in a given order on different storage devices within the RAID array. In addition, parity data blocks are computed for each of the data stripes and written to a data storage device within the RAID array. The parity data blocks for the data stripes are not written to a single storage device but are distributed across all the storage devices within the RAID array. The parity data block for a given data stripe can be used to recalculate the data of a constituent data strip in the event that the constituent data strip is lost due to a storage device failure.

RAID 5 utilizes a single parity function (e.g., XOR function) to compute a parity data block for a given data stripe, while RAID 6 utilizes two independent parity functions to compute two different parity data blocks for a given data stripe, which are written to two separate storage devices within the RAID 6 array. RAID 5 requires a minimum of three storage devices while RAID 6 requires a minimum of four storage devices. The capacity of a RAID 5 array comprising N storage devices is equal to (N−1) times the size of the smallest storage device in the array (as the capacity of one storage device is used to store the parity function data to provide fault tolerance). The capacity of a RAID 6 array comprising N storage devices is equal to (N−2) times the size of the smallest storage device in the array (as the capacity of two storage devices is used to store the parity function data to provide fault tolerance).

Figure 3:
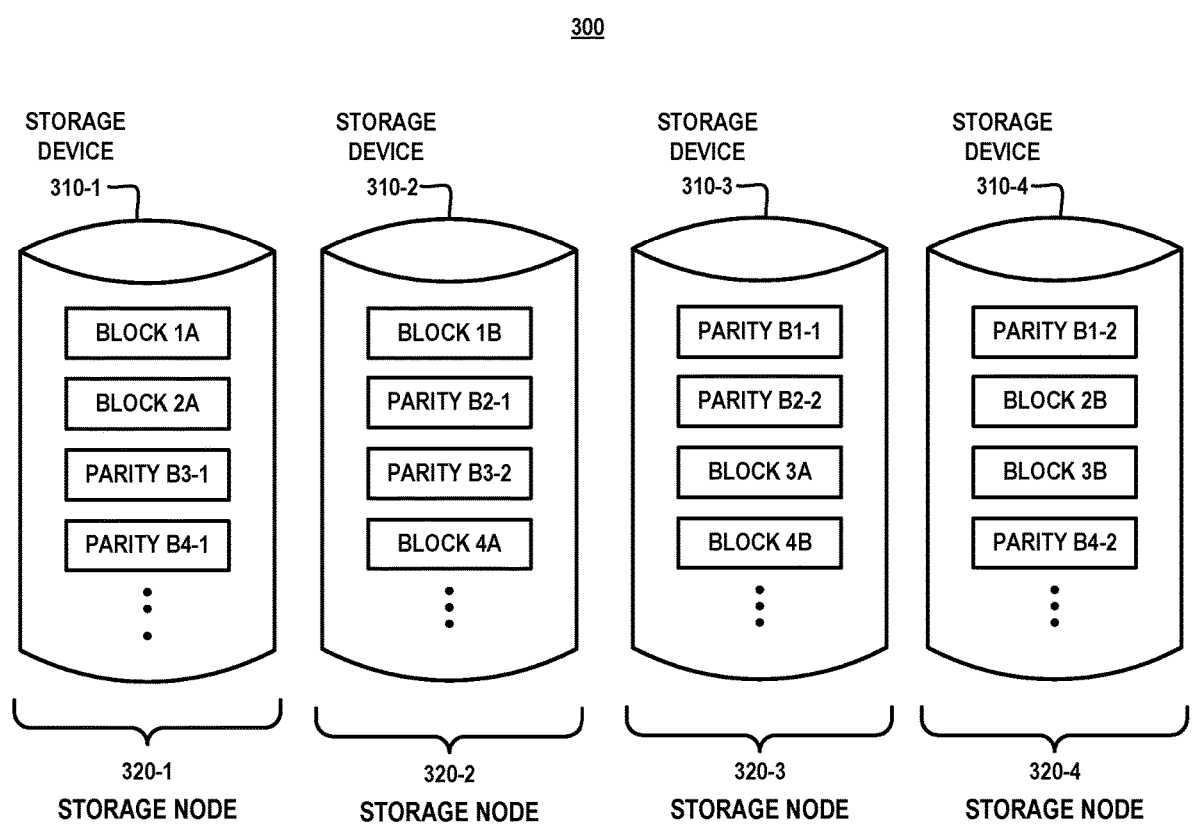
FIG. 3 schematically illustrates a RAID 6 configuration which can be implemented in the information processing system of FIGS. 1A and 1B, according to an exemplary embodiment of the disclosure.

For example, FIG. 3 schematically illustrates a RAID 6 configuration 300 which can be implemented in the system 100 of FIGS. 1A and 1B. In particular, as shown in FIG. 3, the RAID 6 configuration 300 comprises four storage devices 310-1, 310-2, 310-3, and 310-4, wherein each storage device 310-1, 310-2, 310-3, and 310-4 is associated with a different storage node 320-1, 320-2, 320-3, and 320-4, respectively. In the exemplary embodiment of FIG. 3, each data block (data stripe), Block 1, Block 2, Block 3, Block 4, etc., is divided into two constituent data blocks (data strips) and has two independent parity data blocks. In particular, as shown in FIG. 3, Block 1 is divided into two constituent data blocks, Block 1A and Block 1B, and has two independent parity data blocks, Parity B1-1 and Parity B1-2 (e.g., P and Q parity codes). Block 2 is divided into two constituent data blocks, Block 2A and Block 2B, and has two independent parity data blocks, Parity B2-1 and Parity B2-2. Block 3 is divided into two constituent data blocks, Block 3A and Block 3B, and has two independent parity data blocks, Parity B3-1 and Parity B3-2. Block 4 is divided into two constituent data blocks, Block 4A and Block 4B, and has two independent parity data blocks, Parity B4-1 and Parity B4-2.

While FIG. 3 illustrates an exemplary RAID 6 layout for the data blocks and parity data blocks, different RAID 6 layout schemes can be implemented which specify the order and location in which the constituent data blocks (strips) and associated parity data blocks for the data blocks (stripes) are written to the storage devices 310-1, 310-2, 310-3, and 310-4 within the RAID 6 configuration 300. The RAID configuration 300 comprises the minimum of four storage devices and two independent data parity blocks for each data stripe to provide resiliency and data protection in the event of two failures.

In some embodiments, the management nodes 115 of the system 100 (FIG. 1A) will automatically initiate and perform a rebuild process when there is a failure of a given storage device 180 of a storage node 140 or when there is a failure of a given storage node 140. A storage device failure can arise in instances where, for example, (i) the storage device suffers a hardware failure or malfunction, (ii) an associated hardware device driver is damaged or corrupted, (iii) there is a faulty connection (e.g., bad cable or bus) connecting the storage device 180 to the storage node 140, (iv) there is a power failure of the storage device, or when (v) the storage node 140 which controls the storage device 180 crashes, etc.

The data recovery control system 117 of the management nodes 115 can initiate and manage different types of data recovery processes in the event of different types of failures. For example, when a failure of a given storage device 180 is the result of a hardware failure or malfunction of the storage device 180 or a failure or malfunction of the associated storage node 140, the data recovery control system 117 can automatically initiate a "forward rebuild" process. A forward rebuild process involves, e.g., allocating spare capacity of one or more storage devices within the cluster of storage nodes 140, and providing instructions to the storage control systems 150 of the storage nodes 140 to commence a rebuild process to rebuild the spare capacity with the data of the failed storage device(s) using replica or mirror copies of the data on another storage device or reconstructing the missing data using existing data blocks and parity information, etc.

In some embodiments, when the failed storage device or storage node is associated with a given RAID array that is managed by a given RAID control module 170, the rebuild control module 176 will proceed to perform a background rebuild process according to the rebuild parameters/instructions provided by the management nodes 115 and using the spare capacity allocated by the management nodes 115. The RAID rebuild control module 176 will rebuild the spare capacity with the missing data using the associated RAID algorithms and parity data, mirror copies, etc., depending on the given RAID level configuration.

In other embodiments, when a failure of a given storage device 180 or associated storage node 140 is the result of a fixable problem (e.g., power failure), the data recovery control system 117 can automatically initiate a "backward rebuild" process. A backward rebuild process involves, e.g., re-attaching a storage device or storage node in the storage environment after the failure is fixed, and then updating or otherwise synchronizing the data on the re-attached storage devices to add the changes that were made to the data during the period of time that the storage device or associated storage node was inaccessible.

The data recovery control system 117 can determine whether to perform a forward rebuild or backward rebuild operation depending on the type of failure, and the latency associated with certain rebuild operations. For example, when a failure of a given storage device 180 or associated storage node 140 is fixable, the data recovery control system 117 can automatically initiate a "backward rebuild" process when the problem is fixed, or initiate a forward rebuild operation to rebuild the missing data on spare capacity in instances where performing the forward rebuild operation would result in a faster recovery time as compared to performing a backward rebuild process.

In some embodiments, the management nodes 115 (FIG. 1A) will monitor "heartbeats" from the storage nodes 140, and when a heartbeat for a given storage node 140 is not detected, the management nodes 115 will determine that the given storage node 140 has failed. The data recovery control system 117 will initiate a rebuild process to protect the data and the management nodes 115 may perform additional operations as needed to re-configure the storage environment in response to the detected storage node failure. In other embodiments, when the storage control system 150, or RAID control module 170, of a given storage node 140 detects the occurrence of an I/O failure when reading or writing to a given storage device 180 of a given storage node 140, the storage control system 150 will provide notification to the management nodes 115 of the storage device I/O error that was returned for the given storage device. In response to the notification, the data recovery control system 117 will initiate a rebuild process to protect the data and the management nodes 115 may perform additional operations as needed to re-configure the storage environment in response to the detected storage device failure.

When utilizing spare capacity as part of a background rebuild operation, there are performance implications that must be considered. For example, when spare capacity is allocated, the spare capacity does not initially contain any data. When new data is written to the spare capacity, the write operation needs to update metadata that is associated with the newly written data, wherein the metadata indicates which portions of the spare capacity are valid and which portions are not valid. The size of the metadata can affect performance as the granularity of the metadata is typically greater than the I/O granularity. For example, the storage system may be configured such that the metadata might only be able to track changes at a granularity of 32 KB, whereas the granularity of the I/O is 4 KB. In this instance, there is a performance overhead introduced by the need to read 28 KB, and combine it with the user's 4 KB to thereby create a larger write of 32 KB which can be referred to by the metadata. The term "working area" as used herein refers to the area of metadata granularity (e.g., 32 KB).

Furthermore, the allocation of the spare capacity is a process that is not instantaneous, especially when the spare capacity is shared among a plurality of storage nodes. In such instance, the actual capacity is only allocated once there is a failure because the spare may be used by whatever storage node happens to need the spare capacity when there is a failure. During a failure, and even more so during multiple failures, there will be many requests from the spare allocation mechanism that may lead to a bottleneck that will slow down user I/O. For RAID background rebuild operations, the time it takes to complete a rebuild process will vary depending on factors such as the number of storage device failures, the capacity of the failed storage devices which must be rebuild, the bandwidth allocated to perform I/O rebuild operations as compared to performing user I/O operations, etc.

In particular, the failure of high capacity storage devices (e.g., capacities on the order of terabytes) or multiple high capacity storage devices can result in relatively long rebuild operations that take hours or days to complete. Moreover, in some embodiments, when a RAID rebuild process is initiated, the data recovery control system 117 can specify a rebuild throttling policy associated with RAID background rebuild process. The rebuild throttling policy for the RAID rebuild process determines the priority of performing rebuild I/O operations versus performing user/application I/O operations when accessing storage devices. Different rebuild throttling policies can be applied which (i) place no limit on rebuild I/O operations, (ii) limit concurrent I/O operations for a given storage node, (iii) favor user/application I/O operations, (iv) implement dynamic bandwidth throttling, etc. Applying rebuild throttling will increase the time it takes to complete a rebuild operation and keep the RAID system in a degraded mode of operation, while reducing the impact on user I/O performance.

Moreover, there are performance implications that must be considered with regard to performing degraded write operations, wherein the performance implications vary depending on the given RAID configurations. For example, with regard to RAID 1, there is no performance degradation when performing a degraded write operation. In particular, a degraded write operation for a RAID 1 configuration with N storage devices involves writing data (which is associated with an I/O write request) to the existing storage devices when one or more of the N storage devices has failed or is otherwise not available. In this instance, the degraded write operation involves writing less than N copies of the data to the storage devices.

For example, in the exemplary RAID 1 configuration 200 of FIG. 2, assume that the storage device 210-3 has either failed or is unavailable due to a failure of the storage node 220-3, thereby placing the RAID 1 configuration in a degraded mode. In this failure state, a degraded write operation would involve (i) writing data to the storage device 210-1 of the primary storage node 220-1 and (ii) writing a mirror copy to the storage device 210-2 of the mirror storage node 220-2. In this instance, there is no penalty associated with the degraded write operation when the data is written to only the storage devices 210-1 and 210-2 and not the failed/unavailable storage device 210-3. Moreover, there is no performance penalty associated with a subsequent read operation that is performed in response to an I/O read request for the previously written data, as the requested data (e.g., Block 1) can be read from one of the storage devices 210-1 and 210-2 without the need to reconstruct such requested data as with RAID configurations that utilize parity data for fault tolerance.

On the other hand, there is a performance penalty associated with degraded write operations for parity-based RAID configurations. In particular, there is a performance penalty when a user issues an I/O read request to read data back from a failed storage device, which requires the RAID control module to reconstruct the requested data using the remaining data (e.g., parity data) on the currently available storage devices within the RAID array.

For example, in the exemplary RAID 6 configuration 300 of FIG. 3, assume that the storage device 310-1 has either failed or is unavailable due to a failure of the storage node 320-1, thereby placing the RAID 6 configuration 300 in a degraded mode. Assume further that an I/O write request has been received to write data to data Block 1A. In this failure state, since the data Block 1A is not available, the degraded write operation would involve (i) reading the data Block 1B, and the parity data blocks Parity B1-1 and Parity B2-1, (ii) computing new parity data for the parity blocks Parity B1-1 and Parity B2-1 using the received I/O write data and the read data Block 1B, and (iii) writing the new parity data blocks Parity B1-1 and Parity B2-1 to the storage devices 310-3 and 310-4.

With the degraded write operation, the updated data Block 1A is not written to a storage device, but rather the new parity data blocks Parity B1-1 and Parity B2-1 will include the information that is needed to reconstruct the updated data Block 1A to serve a subsequent I/O read request for the updated data Block 1A. In particular, in response to a I/O read request for the updated data Block 1A, a degraded read operation would be performed which involves (i) reading (i) reading the data Block 1B, and the new parity data blocks Parity B1-1 and Parity B2-1, (ii) reconstructing the data Block 1A using the data Block 1B and the new parity data blocks Parity B1-1 and Parity B2-1, and (iii) returning the reconstructed data Block 1A to serve the I/O read request. In this regard, there is a performance penalty associated with a degraded read operation that is performed to read data from a failed storage device of the RAID array because the data must be reconstructed using the remaining data on the currently available storage devices of the RAID array.

As noted above, the RAID control module 170 implements methods that are configured to provide a balance between I/O performance and data resiliency when processing user I/O write requests during periods when the RAID control module 170 is operating the RAID array in a degraded mode. When the RAID array is operating in a degraded mode, the degraded write control module 178 is configured to make intelligent decisions for processing user I/O write requests by selecting between (i) performing a degraded write to the RAID array or (ii) performing write operations to spare capacity. In this configuration, the RAID control module 170 distinguishes between user I/O write requests to the RAID array and I/O requests that are associated with a background rebuild process of the RAID array, which is handled by the rebuild control module 176.

In some embodiments, the degraded write control module 178 makes decisions on how to process user I/O write requests based, in part, on the amount of resiliency that remains for the given RAID configuration when operating in a degraded mode. For example, for a RAID array that provides resiliency against two failures, the decision on whether to perform a degraded I/O write operation as opposed to performing a write operation to spare capacity will depend on whether the RAID array is in a degraded state of one failure (in which case a level of fault tolerance exists to another failure) or in a degraded state of two failures (in which case the RAID array cannot protect against another failure). When the RAID array is in a degraded mode with some remaining resiliency, the RAID control module 170 can be configured such that only the background rebuild process performed by the rebuild control module 176 will allocate and write to spare capacity to obtain resiliency. The background process is not latency sensitive and can tolerate the performance overhead.

On the other hand, for user I/O write requests, which are performance sensitive, the RAID control module 170 will process the user I/O request by writing to spare capacity only if the background process already allocated the spare capacity and the data block associated with the I/O write request has been rebuilt on the spare capacity. Otherwise, the RAID control module 170 will perform a degraded write operation by writing the data associated with the user I/O request to the functionally accessible storage devices of the RAID array. On the occurrence of two failures (with no remaining protection against another failure), resiliency becomes critical and all user I/O write requests are processed by writing the data to the RAID array using the spare capacity.

Figure 4A:
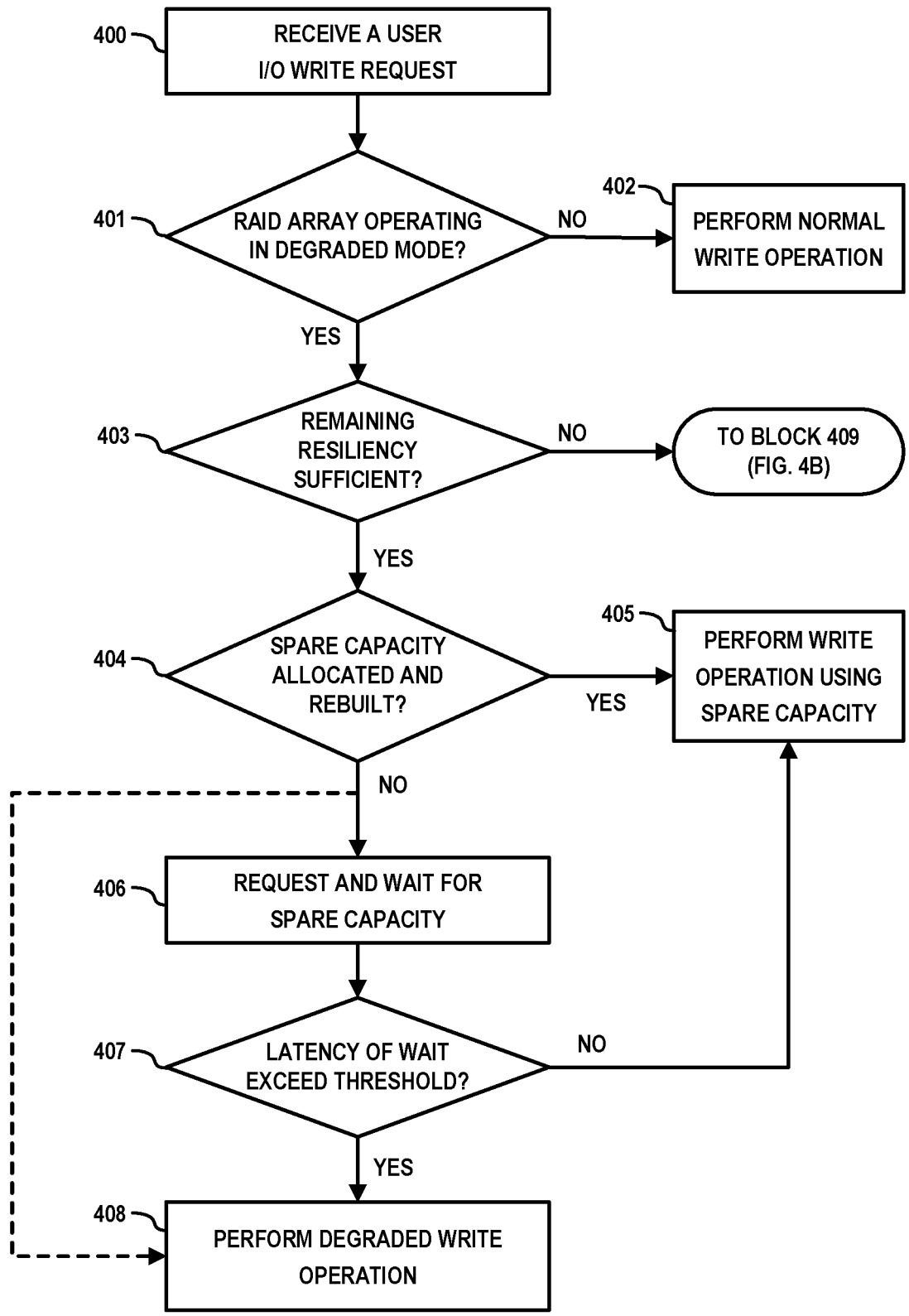
FIGS. 4A and 4B illustrate a flow diagram of a method that is implemented in a RAID storage system for processing user I/O write requests by selecting between performing a degraded write operation or performing a write operation to spare capacity, when operating in a degraded mode, according to an exemplary embodiment of the disclosure.
Figure 4B:
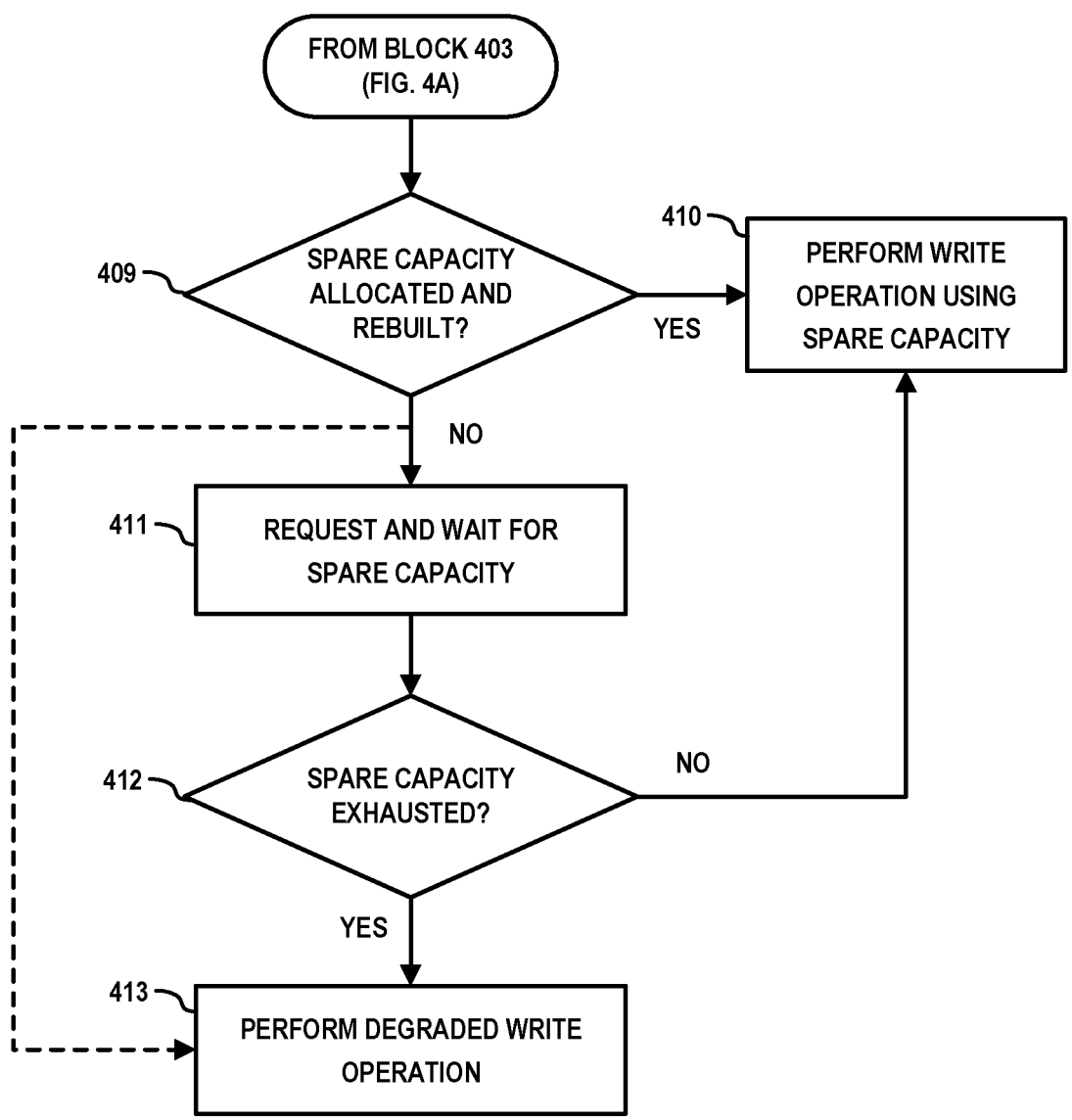

FIGS. 4A and 4B illustrate a flow diagram of a method that is implemented in a RAID storage system for processing user I/O write requests by selecting between performing a degraded write operation or performing a write operation to spare capacity, when operating in a degraded mode, according to an exemplary embodiment of the disclosure. In some embodiments, FIGS. 4A and 4B illustrate an exemplary mode of operation of the RAID control module 170 of FIG. 1B to provide a balance between I/O performance and data resiliency when processing user I/O write requests during periods when the RAID control module 170 is operating a RAID array in a degraded mode. For illustrative purposes, the process flow will be discussed in the context of the information processing system 100 of FIGS. 1A and 1B.

Referring to FIG. 4A, the RAID control module 170 receives a user I/O write request to write data to a RAID array (block 400). As noted above, in some embodiments, the I/O requests of a given compute node 110 are serviced by the SDC that runs on the same server as the compute node, and when the I/O request is a write request, the SDC will send the I/O write request to the storage node 140 where the primary copy of the data is located or to the storage node 140 having the RAID control module 170 that is assigned to handle the data striping and parity computations for the given RAID array.

A determination is made as to whether the RAID array is operating in a degraded mode (block 401). If it is determined that the RAID array is not operating in a degraded mode (negative determination in block 401), the RAID control module 170 will perform a normal write operation according to the given RAID array configuration (block 402). For example, for a RAID 1 configuration, the RAID control module 170 will proceed to write the data of the I/O write request to a local storage device (e.g., primary copy) as well as write mirror copies of the data to remote storage devices within the RAID array. For a RAID 6 configuration, the RAID control module 170 will perform the requisite data striping and parity computation functions to write the data to local and remote storage devices of the RAID array.

On the other hand, if it is determined that the RAID array is operating in a degraded mode (affirmative determination in block 401), the RAID control module 170 will proceed to determine whether to perform a degraded write operation or to perform a write operation using spare capacity. Such a determination is made based on factors such as, e.g., the amount of resiliency that remains (decision block 403) for the given RAID configuration when operating in a degraded mode, and whether spare capacity has been allocated and a current state of a rebuild process (decision block 404), and other relevant factors.

The RAID array will be operating in a degraded mode when there is at least one failure associated with a storage device or storage node associated with the RAID array. The user I/O write request may be received (in bock 400) at a time when the RAID array is already operating in a degraded mode as a result of one or more failures of storage devices and/or storage nodes associated with the RAID array. In this instance, the RAID control module 170 may be in the process of performing a rebuild operation as instructed by the management node 115 using spare capacity that was allocated for the rebuild operation by the management node 115.

In other instances, the I/O write request may be received (in bock 400) at a time when the RAID array is not operating in a degraded mode, but where the execution of the normal write operation (block 402) is unsuccessful and the RAID control module 170 receives an I/O error (e.g., storage device I/O error) as a result of the failure of the write operation. In some embodiments, when an I/O error is returned in response to an attempted write operation to the RAID array, the RAID control module 170 will proceed to execute any suitable process for handling I/O errors as implemented by the storage control system 150 and/or the RAID control module 170.

In addition, the RAID control module 170 can proceed to determine whether the I/O error was the result of a storage device failure, a storage node failure, a network failure, etc. As noted above, there are many reasons that an I/O error may occur such as a storage device hardware malfunction, a faulty connection, power failure of the storage device, failure of a remote storage node 140, etc. The RAID control module 170 can make such determination based on various factors including, but not limited to, receiving many I/O errors (in a relatively short period of time) for write operations directed to a given storage device, receiving notification from the management nodes 115 of a given failure of a storage device, a storage node, or a communications network, etc., causing such I/O errors, or other types of conditions or indications that enable the RAID control module 170 to determine that a storage device of the RAID array has failed or is otherwise unavailable.

In some embodiments, as noted above, when an I/O error occurs, the storage control system 150 will provide notification of the I/O error to the management layer (e.g., management nodes 115). In response to the notification, the management layer will automatically perform certain operations to reconfigure the storage environment as needed and recover from the I/O error. Such operations include, for example, providing instructions to one or more storage control systems to proceed with rebuilding a failed storage device or failed storage node (e.g., failed server), providing instructions to a RAID control module to rebuild data of the RAID array using spare capacity that is allocated by the management layer, reconfigure the mapping metadata of the storage environment so that clients direct I/O requests to another storage control system (of another storage node 140) which comprises a storage device that has a backup or replica of the data stored in the failed storage device, etc.

When the RAID control module 170 determines that the I/O errors are the result of some failure associated with the RAID array, the RAID control module 170 can determine that the RAID array is in a degraded operational state and continue to process user I/O requests with the RAID array in a degraded mode. In the degraded mode, the RAID array remains functional but with a reduced fault tolerance or no more fault tolerance depending on the number of concurrently existing failures at the given time, and the fault tolerance (e.g., maximum number of allowable concurrently existing failures) for the given RAID array configuration.

In all instances where the RAID array is deemed to be operating in a degraded mode (affirmative determination in block 401), the RAID control module 170 will proceed to determine whether (i) to perform a degraded write operation or (ii) to perform a write operation using spare capacity. In some embodiments, such a determination is based, in part, on determining whether a remaining resiliency of the RAID array is sufficient to provide a desired level of fault tolerance (determination in block 403). For example, in some embodiments, such determination is made based on the number of concurrently existing failures (f) of the RAID array as compared to a maximum number of concurrent failures (F) that the RAID array can handle without loss of data. In some embodiments, the remaining resiliency of the RAID array will be deemed sufficient (affirmative determination in block 403) when the number of concurrently existing failures is less than the maximum number of concurrent failures that the RAID array can handle without loss of data (i.e., when f<F).

For example, the exemplary RAID 1 configuration 200 shown in FIG. 2 provides fault tolerance against a maximum of two concurrent failures (F=2). Similarly, the exemplary RAID 6 configuration 300 shown in FIG. 3 provides fault tolerance against a maximum of two concurrent failures (F=2). In such embodiments, the remaining resiliency of the RAID array can be deemed sufficient (affirmative determination in block 403) when there is one existing failure (i.e., f=1), whereas the remaining resiliency of the RAID array will be deemed insufficient (negative determination in block 403) when there are two concurrently existing failures (i.e., f=2).

In other embodiments, RAID arrays can be configured to provide fault tolerance against more than two concurrent failures (e.g., F=3, 4, 5, . . . ) in certain applications where such high level of fault tolerance is desired. In such embodiments, the remaining resiliency of the RAID array can be deemed insufficient when the number of concurrently existing failures (f) of the RAID array is equal to the maximum number of concurrently existing failures (F) that the RAID array can handle (i.e., when f=F, where F=3, 4, 5, . . . ) without loss of data. In other embodiments, when a RAID array is configured to provide fault tolerance against more than two concurrent failures (e.g., F=3, 4, 5, etc.) the remaining resiliency of the RAID array can be deemed insufficient when the number of concurrently existing failures (f) of the RAID array is less than the maximum number of concurrent failures (F) that the RAID array can handle, e.g., when f=F-1, f=F-2, etc., depending on the given application.

In particular, the determination (in block 403) as to whether the remaining resiliency of a given RAID array is sufficient or insufficient can be determined based on a resiliency threshold value ($f_{Threshold}$) that is set (statically or dynamically) based on various operating characteristics of the RAID array. For example, in a fault-tolerant storage system where the storage device failure rate is relatively high and the time to perform a background rebuild process is relatively long, it may be desirable to set the resiliency threshold value to some value that is less than F (i.e., $f_{Threshold}$<F) to ensure that RAID control system can perform degraded writes while still protecting against loss of data in the event that a number of concurrent failures f at some point in time exceeds the maximum number of concurrent failures (F) that the RAID array can handle, before a background rebuild process can be completed for one or more failed storage devices.

For example, assume a given RAID array has a fault tolerance against a maximum of four failures (i.e., F=4), and that the resiliency threshold value is set to three (i.e., $f_{Threshold}$=3). In this example, the determination (in block 403) as to whether the remaining resiliency of a given RAID array is sufficient or insufficient can be determined based on comparing a number of concurrently existing failures (f) to the resiliency threshold value ($f_{Threshold}$). The remaining resiliency of the RAID array can be deemed sufficient (affirmative determination in block 403), when the number of concurrently existing failures is less than the resiliency threshold value (i.e., f<$f_{Threshold}$). On the other hand, the remaining resiliency of the RAID array can be deemed insufficient (negative determination in block 403), when the number of concurrently existing failures is equal to or greater than the resiliency threshold value (i.e., f≥$f_{Threshold}$). In the exemplary embodiment where F=4, when the number of concurrently existing failures is determined to be equal to the resiliency threshold value (e.g., f=$f_{Threshold}$=3), the remaining resiliency of one (1) failure (i.e., F-$f_{Threshold}$ or 4-3=1) is can be deemed insufficient for purposes of performing a degraded write operation while protecting against potential loss of data as a result of one or more additional failures before completion of a background rebuild process.

In some embodiments, the resiliency threshold value ($f_{Threshold}$) for a given fault-tolerant storage system can be determined based on statistical data and computations associated with hardware failures and software failures. For example, hardware failure characteristics of storage devices can be determined as a function of failure rate over time. Moreover, availability of hardware and software components can be determined based on reliability parameters or metrics including, but not limited to, mean time between failures (MTBF), failure in time (FIT) (which denotes a failure rate of 1 per billion hours), mean time to repair (MTTR), etc. In this regard, it is to be understood that the resiliency threshold value ($f_{Threshold}$) for a given fault-tolerant storage system can be computed using various statistical methods and reliability parameters known in the art, and such threshold value will vary depending on the statistically determined availability and reliability characteristics associated with the various hardware and software components that are utilized in the fault-tolerant data storage system.

Referring back to FIG. 4A, when the remaining resiliency of the RAID array is deemed sufficient (affirmative determination in block 403), a determination is made as to whether spare capacity has been allocated and rebuilt with missing data of the RAID array (determination in block 404). As noted above, in some embodiments, when there is a failure of a given storage device or storage node, the management layer will proceed to allocate spare capacity of an existing storage device of a given storage node and initiate a rebuild process by instructing the storage control systems to rebuild the missing data of the failed storage device(s) and/or storage node(s) associated with the given RAID array and repopulate the allocated spare capacity with the rebuilt data. For example, for the exemplary RAID 1 configuration 200 shown in FIG. 2, a rebuild operation involves storing a mirror copy of the data on the spare capacity using the existing data from a given storage device of the RAID array. For the exemplary RAID 6 configuration 300 of FIG. 3, a rebuild operation involves, e.g., rebuilding the data on a failed storage device using the P and Q parity and data on the remaining storage devices of the RAID array.

When the spare capacity has been allocated and rebuilt with the missing data of the RAID array (affirmative determination in block 404), the write operation can be performed using the spare capacity (block 405). In some embodiments, at the time the user I/O write request is received (in block 400), the rebuild process can be in an intermediate stage where a portion of the missing data has been copied or otherwise reconstructed and repopulated on the spare capacity. In this instance, the "working area" for a given block of data associated with the received user I/O write request may have already been rebuilt on the spare capacity, in which case, the write operation can be performed using the spare capacity (block 405). On the other hand, the "working area" for the given block of data associated with the received user I/O write request may not yet have been rebuilt on the spare capacity. In this instance, while the spare capacity may be allocated and available, the spare capacity may be only partially rebuilt and does not yet have the rebuilt data and associated metadata associated with the received user I/O write request (resulting in a negative determination in block 404).

When it is determined that the spare capacity has been allocated but that the data associated with the I/O write request has not yet been rebuilt on the spare capacity (negative determination in block 404), the RAID array control module 170 can request access to the spare capacity and wait to perform a write operation using the spare capacity when the request is served (block 406). If the latency of the wait exceeds a predetermined latency threshold (affirmative determination in block 407), the RAID control module 170 will proceed to perform a degraded write operation (block 408). On the other hand, if it is determined that the I/O request is, or can be, served with a latency that does not exceed the latency threshold (negative determination in block 407), the write operation is performed using the spare capacity.

In some embodiments, the process flow of blocks 406 and 407 is not implemented. For example, if the spare capacity has not yet been allocated or is otherwise unavailable, the RAID control module 170 will proceed to perform a degraded write operation (block 408), as indicated by the dashed line from block 404 to block 408 in FIG. 4A. In other embodiments, when the RAID array comprises a RAID 1 mirror configuration, if the spare capacity has been allocated but the data associated with the I/O write request has not yet been rebuilt on the spare capacity (resulting in a negative determination in block 404), the RAID array control module 170 will proceed to perform a degraded write operation (block 408). This alternate process flow is indicated by the dashed line from block 404 to block 408 in FIG. 4A. This alternate process flow is based on the latency threshold being set to zero "0" for a RAID 1 array configuration because there is no latency associated with performing a degraded write operation for a RAID 1 mirror configuration.

Indeed, for a RAID 1 configuration, no I/O performance advantage is obtained by waiting for the rebuild operation (in block 406) to perform a write operation using the spare capacity (block 405) as compared to performing a degraded write operation (block 408). In particular, for a RAID 1 configuration, no performance advantage is realized by avoiding a degraded write operation for a given data block because, unlike parity-based RAID configurations, a subsequent read operation for the given data block does not require parity and/or data computations to be performed to read the given data block that was previously written to the RAID 1 array using a degraded write. Indeed, a subsequent read operation of the data block from the RAID 1 array only needs to read the data directly from a primary or mirror storage device.

In this instance, for a RAID 1 array configuration, the RAID control module 170 will proceed to perform a degraded write operation (block 408) to serve the user I/O write request with minimal latency, as opposed to waiting to utilize the spare capacity to complete the user I/O write request. Eventually, the I/O write data associated with the degraded write operation will be written to the spare capacity using RAID rebuild I/O write operations during the background rebuild process.

On the other hand, in embodiments where a parity-based RAID array configuration is implemented (e.g., the RAID 6 configuration 300, FIG. 3), the process flow of blocks 406 and 407 can be performed to enhance performance in the execution of user I/O write requests. For example, there can be instances where the latency associated with performing a write operation using the spare capacity is greater than the latency associated with performing a degraded write operation. In such instances, when the latency of waiting for spare capacity and performing the write operation using the spare capacity is greater than the latency of performing a degraded write (affirmative determination in block 407), a degraded write operation is performed (block 408) to serve the user I/O write request. In this instance, the I/O write data associated with the degraded write operation will be written to the spare capacity using RAID rebuild I/O write operations during the background rebuild process.

On the other hand, there can be instances where the latency associated with performing a write operation using the spare capacity is less than or essentially the same as the latency associated with performing a degraded write operation. In such instances, when it is determined that the latency of waiting for spare capacity and performing the write operation using the spare capacity does not exceed the latency of performing a degraded write operation (negative determination in block 407), the user I/O write request will be served by performing a write operation using the spare capacity (block 405).

In some embodiments, the latency threshold value that is implemented for the determination process of decision block 407 can be a predetermined timeout value or a dynamically allocated timeout value that is adjusted to account for overall system performance and different throttle rates for the background RAID array rebuild process. Moreover, in some embodiments, depending on the application, the latency threshold value can determined based, at least in part on, the performance advantage that is realized for subsequent read operations in a parity-based RAID configuration, which is obtained by waiting for the rebuild operation (in block 406) and performing a write operation using the RAID array with the spare capacity (block 405).

Indeed, when the I/O write operation is performed for a given data block using the spare capacity (block 405), a performance advantage is realized with regard to subsequent I/O read requests for the given data block as the data block can be read from the RAID array (e.g., using spare capacity) without having to perform the data/parity computations that would be needed as part of the I/O read operation to reconstruct a missing data block. In contrast, if data is written to the RAID array using a degraded write operation (block 408), a subsequent I/O read operation to read such data could require (i) reading the associated data strips and/or parity blocks from the existing storage devices of the RAID array, and (ii) performing the computations that are needed to reconstruct the missing data using the data strips and parity data. Thus, writing data to a RAID array using a degraded write operation results in reduced I/O performance for subsequent read operations for the data due to the increased latency associated with having to read the existing data strips and parity and perform the computations as needed to reconstruct the missing data.

Referring back to decision block 403, if it is determined that the remaining resiliency of the RAID array is not sufficient to provide a desired level of fault tolerance (negative determination in block 403), the process flow proceeds to block 409 of FIG. 4B, where a determination is made as to whether spare capacity has been allocated and rebuilt with missing data of the RAID array (decision block 409). In some embodiments, as noted above, the remaining resiliency of the RAID array is deemed insufficient when the number of concurrently existing failures (f) of the RAID array is equal to the maximum number of concurrently existing failures (F) that the RAID array can handle without loss of data (i.e., when f=F). In other embodiments, the remaining resiliency of the RAID array can be deemed insufficient when the number of concurrently existing failures (f) of the RAID array is less than the maximum number of concurrent failures (F) that the RAID array can handle without data loss, e.g., when f=F−1, f=F−2, etc., depending on, e.g., the resiliency threshold value ($f_{Threshold}$) that is specified for the given storage system, as discussed above.

If it is determined that the spare capacity has been allocated and rebuilt with missing data of the RAID array (affirmative determination in block 409), the pending user I/O write request can be served by performing a write operation to the RAID array using the spare capacity (block 410). When it is determined that the spare capacity has been allocated but that the data associated with the I/O write request has not yet been rebuilt on the spare capacity (negative determination in block 409), the RAID array control module 170 will request access to the spare capacity and wait to perform a write operation using the spare capacity when the request is served (block 411). In this instance, given that the remaining resiliency has been deemed insufficient, the RAID control module 170 will proceed to maximize the fault tolerance and redundancy at the cost of I/O write performance, by waiting to perform the write operation to the RAID array using the spare capacity regardless of the latency. In some embodiments, if it is determined (in block 409) that the spare capacity has not yet been allocated or is otherwise unavailable, the RAID control module 170 will proceed to perform a degraded write operation (block 413), as indicated by the dashed line from block 409 to block 413 in FIG. 4B.

While the RAID control module 170 is waiting for access to the spare capacity (in block 411) to perform a write operation for the pending user I/O write request, if it is determined that the spare capacity has been exhausted (affirmative determination in block 412), the RAID control module 170 will proceed to perform a degraded write operation (block 413). On the other hand, if the RAID control module 170 is given access to perform the write operation using the spare capacity, and the spare capacity is not yet exhausted (negative decision in block 412), the RAID control module 170 will proceed to serve the pending user I/O write request by performing a write operation to the RAID array using the spare capacity (block 410).

It is to be understood that the process flow of FIGS. 4A and 4B pertains to processing that is performed to handle user I/O write requests. During a background RAID rebuild process, the RAID control module will execute RAID rebuild I/O read and write operations as part of the rebuild process to, e.g., reconstruct the missing data of one or more failed storage devices or storage nodes associated with the RAID array on the spare capacity. In this regard, as noted above, the management layer can allocate I/O bandwidth between I/O requests to spare capacity and rebuild I/O requests to spare capacity, during the execution of the background RAID rebuild process.

Moreover, as demonstrated above, various factors are taken into consideration (e.g., number of existing failures, latency, etc.) in determining whether to process user I/O write requests in a RAID storage system by performing a degraded write operation or by writing to spare capacity, when the RAID storage system is operating in a degraded mode. Such determination is made to strike a balance between fault tolerance and I/O performance in a RAID data storage system operating in a degraded mode at times when there is a relatively small number of existing failures that can tolerate a degraded write operation until the background rebuild operation repopulates the spare capacity with missing data, and other times when there is a relatively large number of existing failures with minimal or no fault tolerance where the system should maximize redundancy at the cost of I/O performance. While conventional RAID systems typically use spare capacity to process user I/O write requests when the spare capacity is available, exemplary embodiments of the disclosure as discussed herein will selectively utilize degraded write operations to process user I/O write requests even when spare capacity is still available in instances where the degraded write operations provide better I/O performance as compared to waiting to write to spare capacity.

Figure 5:
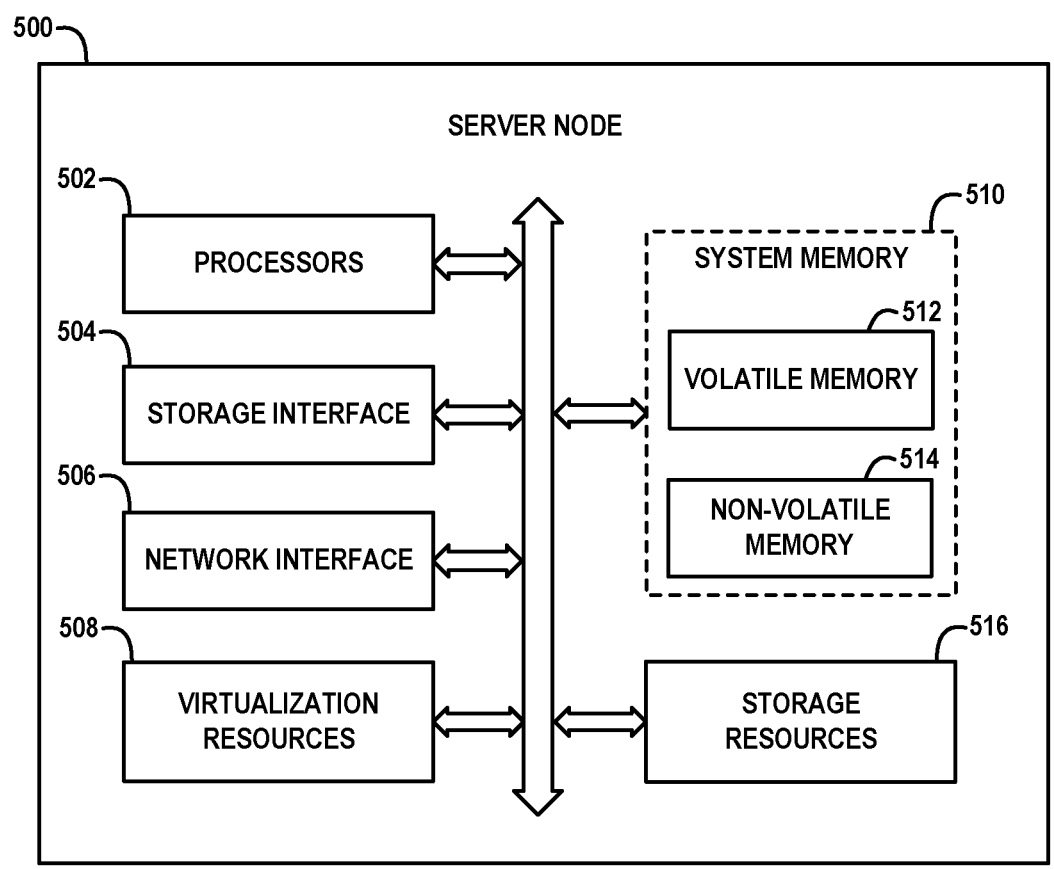
FIG. 5 schematically illustrates a framework of a server node for implementing a storage node which hosts a RAID control module according to an exemplary embodiment of the disclosure.

FIG. 5 schematically illustrates a framework of a server node 500 for implementing a storage node (e.g., storage node 140, FIGS. 1A and 1B) according to an exemplary embodiment of the disclosure. The server node 500 comprises processors 502, storage interface circuitry 504, network interface circuitry 506, virtualization resources 508, system memory 510, and storage resources 516. The system memory 510 comprises volatile memory 512 and non-volatile memory 514. The processors 502 comprise one or more types of hardware processors that are configured to process program instructions and data to execute a native operating system (OS) and applications that run on the server node 500.

For example, the processors 502 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 504 enables the processors 502 to interface and communicate with the system memory 510, the storage resources 516, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 506 enables the server node 500 to interface and communicate with a network and other system components. The network interface circuitry 506 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 508 can be instantiated to execute one or more service or functions which are hosted by the server node 500. For example, the virtualization resources 508 can be configured to implement the various modules and functionalities of the storage control system 150 (FIG. 1B) as discussed herein. In one embodiment, the virtualization resources 508 comprise virtual machines that are implemented using a hypervisor platform which executes on the server node 500, wherein one or more virtual machines can be instantiated to execute functions of the server node 500. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 500, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 508 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 500 as well execute one or more of the various modules and functionalities of the storage control system 150 as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of the storage control systems, snapshot management systems, and data backup management systems comprise program code that is loaded into the system memory 510 (e.g., volatile memory 512), and executed by the processors 502 to perform respective functions as described herein. In this regard, the system memory 510, the storage resources 516, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 510 comprises various types of memory such as volatile RAM, NVRAM, or other types of memory, in any combination. The volatile memory 512 may be a dynamic random-access memory (DRAM) (e.g., DRAM DIMM (Dual In-line Memory Module), or other forms of volatile RAM. The non-volatile memory 514 may comprise one or more of NAND Flash storage devices, SSD devices, or other types of next generation non-volatile memory (NGNVM) devices. The system memory 510 can be implemented using a hierarchical memory tier structure wherein the volatile system memory 512 is configured as the highest-level memory tier, and the non-volatile system memory 514 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 502 to execute a native operating system and one or more applications or processes hosted by the server node 500, and to temporarily store data that is utilized and/or generated by the native OS and application programs and processes running on the server node 500. The storage resources 516 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
   receiving, by a storage control system, a user input/output (I/O) write request comprising data to be written to a RAID (redundant array of independent drives) array comprising a plurality of storage devices, which is managed by the storage control system;
   determining, by the storage control system, whether the RAID array is operating in a degraded mode in which at least one storage device of the plurality of storage devices of the RAID array is inaccessible as a result of a failure; and
   in response to determining that the RAID array is operating in a degraded mode, determining whether to perform a degraded write operation to write the data to the RAID array in the degraded mode, wherein determining whether to perform the degraded write operation comprises:
      determining, by the storage control system, (i) whether spare capacity has been allocated to the RAID array for rebuilding missing data of the at least one inaccessible storage device of the RAID array and (ii) whether a missing data block, which is associated with the data of the I/O write request, has been rebuilt to the allocated spare capacity; and
      processing, by the storage control system, the user I/O write request by performing the degraded write operation using remaining storage devices of the plurality of storage devices of the RAID array without using the spare capacity, in response to determining (i) that the spare capacity has been allocated to the RAID array but that the missing data block, which is associated with the data of the I/O write request, has not been rebuilt to the allocated spare capacity, and (ii) that a latency for performing a write operation to the spare capacity exceeds a latency threshold.

2. The method of claim 1, wherein in response to determining that the RAID array is operating in a degraded mode, the method further comprising:
   determining, by the storage control system, whether a remaining level of resiliency of the RAID array is sufficient to provide fault tolerance against at least one additional failure of the remaining storage devices of the RAID array;
   performing, by the storage control system, the degraded write operation using the remaining storage devices of the plurality of storage devices of the RAID array without using the allocated spare capacity, in response determining that the remaining level of resiliency of the RAID array is sufficient to provide fault tolerance against at least one additional failure of the remaining storage devices of the RAID array; and
   processing, by the storage control system, the user I/O write request by performing a write operation using the allocated spare capacity and the remaining storage devices of the RAID array, in response to determining that the remaining level of resiliency of the RAID array is not sufficient to provide fault tolerance against at least one additional failure of the remaining storage devices of the RAID array.

3. The method of claim 2, wherein determining whether a remaining level of resiliency of the RAID array is sufficient to provide fault tolerance against at least one additional failure of the remaining storage devices of the RAID array, comprises:
   determining, by the storage control system, a number of storage devices of the RAID array which are currently inaccessible;
   determining, by the storage control system, that the remaining level of resiliency of the RAID array is sufficient in response to determining that the number of currently inaccessible storage devices is less than a maximum number of storage device failures that the RAID array is configured to handle to provide fault tolerance; and
   determining, by the storage control system, that the remaining level of resiliency of the RAID array is not sufficient in response to determining that the number of currently inaccessible storage devices is equal to the maximum number of storage device failures that the RAID array is configured to handle to provide fault tolerance.

4. The method of claim 3, wherein the RAID array is configured to provide fault tolerance against no less than two storage device failures.

5. The method of claim 2, wherein determining whether a remaining level of resiliency of the RAID array is sufficient to provide fault tolerance against at least one additional failure of the remaining storage devices of the RAID array, comprises:
   determining, by the storage control system, a number of storage devices of the RAID array which are currently inaccessible;
   determining, by the storage control system, that the remaining level of resiliency of the RAID array is sufficient in response to determining that the number of currently inaccessible storage devices is less than a resiliency threshold value, wherein the resiliency threshold value is less than a maximum number of storage device failures that the RAID array is configured to handle to provide fault tolerance; and
   determining, by the storage control system, that the remaining level of resiliency of the RAID array is not sufficient in response to determining that the number of currently inaccessible storage devices is equal to or greater than the resiliency threshold value.

6. The method of claim 1, wherein determining that the latency for performing the write operation to the spare capacity exceeds the latency threshold, comprises determining that a latency of performing the degraded write operation is less than a latency associated with waiting for availability of the spare capacity to process the I/O write request.

7. The method of claim 1, wherein in response to determining that the RAID array is operating in a degraded mode, the method further comprising:

requesting, by the storage control system, access to the allocated spare capacity to process the user I/O write request; and performing, by the storage control system, a write operation using the allocated spare capacity and the remaining storage devices of the plurality of storage devices of the RAID array, in response to the request to access the allocated spare capacity being served before an expiration of a specified time period;

wherein the storage control system performs the degraded write operation using the remaining storage devices of the plurality of storage devices of the RAID array without using the allocated spare capacity, when the request to access the allocated spare capacity is not served before the expiration of the specified time period.

8. The method of claim 1, wherein the RAID array configuration comprises a RAID level 1 configuration with a fault tolerance against no less than two storage device failures of the plurality of storage devices of the RAID array.

9. The method of claim 1, wherein the RAID array configuration comprises a parity-based RAID configuration with a fault tolerance against no less than two storage device failures of the plurality of storage devices of the RAID array.

10. An article of manufacture comprising a non-transitory processor-readable storage medium having stored therein program code of one or more software programs, wherein the program code is executable by one or more processors to implement a method which comprises:

receiving, by a storage control system, a user input/output (I/O) write request comprising data to be written to a RAID (redundant array of independent drives) array comprising a plurality of storage devices, which is managed by the storage control system;

determining, by the storage control system, whether the RAID array is operating in a degraded mode in which at least one storage device of the plurality of storage devices of the RAID array is inaccessible as a result of a failure; and in response to determining that the RAID array is operating in a degraded mode, determining whether to perform a degraded write operation to write the data to the RAID array in the degraded mode, wherein determining whether to perform the degraded write operation comprises:

determining, by the storage control system, (i) whether spare capacity has been allocated to the RAID array for rebuilding missing data of the at least one inaccessible storage device of the RAID array and (ii) whether a missing data block, which is associated with the data of the I/O write request, has been rebuilt to the allocated spare capacity; and processing, by the storage control system, the user I/O write request by performing the degraded write operation using remaining storage devices of the plurality of storage devices of the RAID array without using the spare capacity, in response to determining (i) that the spare capacity has been allocated to the RAID array but that the missing data block, which is associated with the data of the I/O write request, has not been rebuilt to the allocated spare capacity, and (ii) that a latency for performing a write operation to the spare capacity exceeds a latency threshold.

11. The article of manufacture of claim 10, wherein in response to determining that the RAID array is operating in a degraded mode, the method further comprising:

determining, by the storage control system, whether a remaining level of resiliency of the RAID array is sufficient to provide fault tolerance against at least one additional failure of the remaining storage devices of the RAID array;

performing, by the storage control system, the degraded write operation using the remaining storage devices of the plurality of storage devices of the RAID array without using the allocated spare capacity, in response determining that the remaining level of resiliency of the RAID array is sufficient to provide fault tolerance against at least one additional failure of the remaining storage devices of the RAID array; and processing, by the storage control system, the user I/O write request by performing a write operation using the allocated spare capacity and the remaining storage devices of the RAID array, in response to determining that the remaining level of resiliency of the RAID array is not sufficient to provide fault tolerance against at least one additional failure of the remaining storage devices of the RAID array.

12. The article of manufacture of claim 11, wherein determining whether a remaining level of resiliency of the RAID array is sufficient to provide fault tolerance against at least one additional failure of the remaining storage devices of the RAID array, comprises:

determining, by the storage control system, a number of storage devices of the RAID array which are currently inaccessible;

determining, by the storage control system, that the remaining level of resiliency of the RAID array is sufficient in response to determining that the number of currently inaccessible storage devices is less than a maximum number of storage device failures that the RAID array is configured to handle to provide fault tolerance; and determining, by the storage control system, that the remaining level of resiliency of the RAID array is not sufficient in response to determining that the number of currently inaccessible storage devices is equal to the maximum number of storage device failures that the RAID array is configured to handle to provide fault tolerance.

13. The article of manufacture of claim 11, wherein determining whether a remaining level of resiliency of the RAID array is sufficient to provide fault tolerance against at least one additional failure of the remaining storage devices of the RAID array, comprises:

determining, by the storage control system, a number of storage devices of the RAID array which are currently inaccessible;

determining, by the storage control system, that the remaining level of resiliency of the RAID array is sufficient in response to determining that the number of currently inaccessible storage devices is less than a resiliency threshold value, wherein the resiliency threshold value is less than a maximum number of storage device failures that the RAID array is configured to handle to provide fault tolerance; and determining, by the storage control system, that the remaining level of resiliency of the RAID array is not sufficient in response to determining that the number of currently inaccessible storage devices is equal to or greater than the resiliency threshold value.

14. The article of manufacture of claim 10, wherein determining that the latency for performing the write operation to the spare capacity exceeds the latency threshold, comprises determining that a latency of performing the degraded write operation is less than a latency associated with waiting for availability of the spare capacity to process the I/O write request.

15. The article of manufacture of claim 10, wherein in response to determining that the RAID array is operating in a degraded mode, the method further comprising:
   requesting, by the storage control system, access to the allocated spare capacity to process the user I/O write request; and
   performing, by the storage control system, a write operation using the allocated spare capacity and the remaining storage devices of the plurality of storage devices of the RAID array, in response to the request to access the allocated spare capacity being served before an expiration of a specified time period;
   wherein the storage control system performs the degraded write operation using the remaining storage devices of the plurality of storage devices of the RAID array without using the allocated spare capacity, when the request to access the allocated spare capacity is not served before the expiration of the specified time period.

16. A system, comprising:
   at least one processor; and
   a system memory configured to store program code, wherein the program code is executable by the at least one processor to implement a storage control system which is configured to:
   receive a user input/output (I/O) write request comprising data to be written to a RAID (redundant array of independent drives) array comprising a plurality of storage devices, which is managed by the storage control system;
   determine whether the RAID array is operating in a degraded mode in which at least one storage device of the plurality of storage devices of the RAID array is inaccessible as a result of a failure; and
   in response to determining that the RAID array is operating in a degraded mode, the storage control system is configured to determine whether to perform a degraded write operation to write the data to the RAID array in the degraded mode, wherein in determining whether to perform the degraded write operation, the storage control system is configured to:
      determine (i) whether spare capacity has been allocated to the RAID array for rebuilding missing data of the at least one inaccessible storage device of the RAID array and (ii) whether a missing data block, which is associated with the data of the I/O write request, has been rebuilt to the allocated spare capacity; and
      process the user I/O write request by performing the degraded write operation using remaining storage devices of the plurality of storage devices of the RAID array without using the spare capacity, in response to determining (i) that the spare capacity has been allocated to the RAID array but that the missing data block, which is associated with the data of the I/O write request, has not been rebuilt to the allocated spare capacity, and (ii) that a latency for performing a write operation to the spare capacity exceeds a latency threshold.

17. The system of claim 16, wherein in response to determining that the RAID array is operating in a degraded mode, the storage control system is configured to:
   determine whether a remaining level of resiliency of the RAID array is sufficient to provide fault tolerance against at least one additional failure of the remaining storage devices of the RAID array;
   perform the degraded write operation using the remaining storage devices of the plurality of storage devices of the RAID array without using the allocated spare capacity, in response determining that the remaining level of resiliency of the RAID array is sufficient to provide fault tolerance against at least one additional failure of the remaining storage devices of the RAID array; and
   process the user I/O write request by performing a write operation using the allocated spare capacity and the remaining storage devices of the RAID array, in response to determining that the remaining level of resiliency of the RAID array is not sufficient to provide fault tolerance against at least one additional failure of the remaining storage devices of the RAID array.

18. The system of claim 16, wherein in determining whether a remaining level of resiliency of the RAID array is sufficient to provide fault tolerance against at least one additional failure of the remaining storage devices of the RAID array, the storage control system is configured to:
   determine a number of storage devices of the RAID array which are currently inaccessible;
   determine that the remaining level of resiliency of the RAID array is sufficient, in response to determining that the number of currently inaccessible storage devices is less than a maximum number of storage device failures that the RAID array is configured to handle to provide fault tolerance; and
   determine that the remaining level of resiliency of the RAID array is not sufficient in response to determining that the number of currently inaccessible storage devices is equal to the maximum number of storage device failures that the RAID array is configured to handle to provide fault tolerance.

19. The system of claim 16, wherein determining that the latency for performing the write operation to the spare capacity exceeds the latency threshold, comprises determining that a latency of performing the degraded write operation is less than a latency associated with waiting for availability of the spare capacity to process the I/O write request.

20. The system of claim 16, wherein in response to determining that the RAID array is operating in a degraded mode, the storage control system is configured to:
   request access to the allocated spare capacity to process the user I/O write request; and
   perform a write operation using the allocated spare capacity and the remaining storage devices of the plurality of storage devices of the RAID array, in response to the request to access the allocated spare capacity being served before an expiration of a specified time period;
   wherein the storage control system performs the degraded write operation using the remaining storage devices of the plurality of storage devices of the RAID array without using the allocated spare capacity, when the request to access the allocated spare capacity is not served before the expiration of the specified time period.

* * * * *